July 18, 1961 K. E. BROWN 2,993,175
STABILIZED PULSE GENERATOR CIRCUITS
Filed Oct. 22, 1959
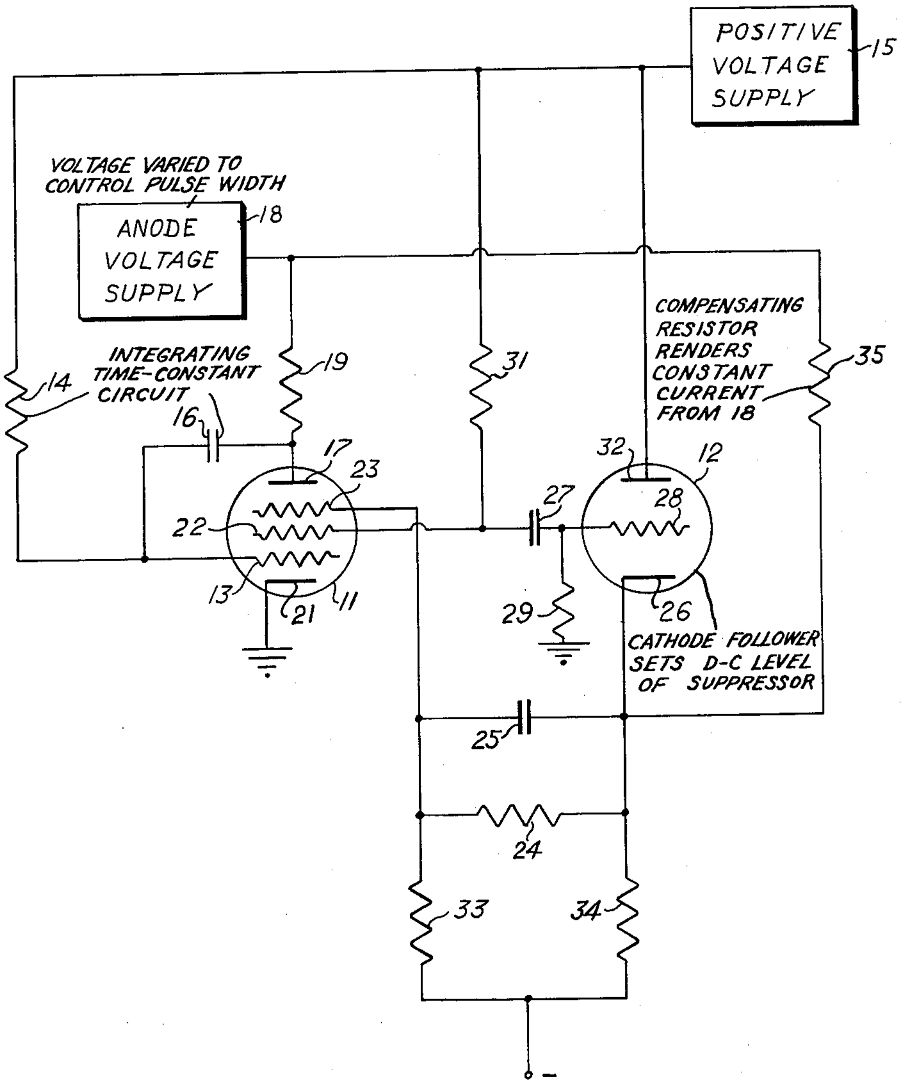
INVENTOR
KENNETH E. BROWN
BY H. Vincent Harsha
ATTORNEY 2,993,175
Patented July 18, 1961

2,993,175

STABILIZED PULSE GENERATOR CIRCUITS

Kenneth E. Brown, Cochituate, Mass., assignor to Raytheon Company, Waltham, Mass., a corporation of Delaware Filed Oct. 22, 1959, Ser. No. 848,000
7 Claims. (Cl. 328—182)

The present invention relates to pulse generator circuits and more particularly to an improved and stabilized phantastron circuit.

The development of radar resulted in the development of a very important class of pulse generator circuits which have been identified by various names such as "phantastron," "sanatron," "sanaphant," etc. These circuits can probably be best described as relaxation oscillators employing Miller feedback to generate a linear timing wave and are similar to multivibrators but differing principally in this respect; whereas the multivibrator establishes its timing waveform which is an exponential by the use of only a RC-differentiator, phantastron-type circuits generate a linear timing waveform by means of the so-called "Miller sweep circuit," a complete description of the operation and components of which can be found on pages 195–197 of "Waveforms," Massachusetts Institute of Technology, Radiation Laboratory Series, 1949. See in particular FIG. 5.44, page 196, for an example of a conventional Miller sweep circuit and a pentode control tube having a screen grid and suppressor grid loop. The use of a linear rather than an exponential timing wave form leads to a very important advantage, namely, the duration of the output signal rectangle can be made a linear function of an input control voltage. Accordingly, phantastron-type circuits are very useful for time modulation and for providing timing pulses.

Under power supply voltage changes, the prior art phantastron-type circuit is considered sufficiently stable for many purposes because its operation depends upon the fact that there is a specific D.C. voltage relationship between the tube elements in the phantastron circuit. Any variation of the source voltage varies all of these voltages in the same proportion causing a relatively small change in the voltage relationship since all voltages are supplied by voltage dividers connected across the same voltage source.

The normal type of D.C. screen grid coupled phantastron circuit of necessity depends upon the D.C. level of the screen grid which is connected to the plate voltage supply through a voltage divider. Heretofore in this type of prior art circuit compensation for different levels of screen voltage such as, for example, as may be required for different tubes or circuit parameters, was made by allowing a resistor in the screen grid circuit to become variable. When this type of phantastron circuit is used as a variable width pulse generator, quite often the width control takes the form of a variable voltage plate supply and most practical methods of accomplishing this, of necessity, introduce equivalent internal resistance in the voltage plate supply.

Irrespective of the basic advantages of the phantastron-type circuit pointed out hereinabove, it is characteristic of such circuits when operated for a fixed interval (the plate supply voltage is constant) that the average current drawn from the plate supply will vary with the repetition rate. An increase in the repetition rate produces a corresponding increase in the average current drawn from the plate supply, hence, the average voltage at the plate supply will drop due to the increased losss through the internal impedance. This produces the same effect as lowering the plate voltage, or in other words produces an error in pulse length as a function of repetition rate. Further, if the plate voltage supply is varied this may require readjustment of the circuit.

The introduction of an impedance into the plate supply also produces a second undesirable effect, i.e., a departure from linearity of the control vs. time characteristic of the phantastron-type circuit. That this occurs may be seen from the following discussion. It is obvious that the average current drawn by the phantastron plate will increase linearly with the plate voltage. However, since the pulse lasts longer, the average current drawn from the plate supply will increase as the square of the plate voltage increase. It therefore follows that since the impedance in the supply causes the terminal voltage to be a function of the current drawn, this represents a departure from linearity of the control (plate voltage) vs. time (pulse length) characteristic of the phantastron-type circuit.

The above disadvantages are overcome by the present invention which contemplates and has as a primary object the provision of a phantastron-type circuit that appears as a linear load to the plate voltage supply and that draws a constant current.

It is another important object of the present invention to achieve independence of the screen grid characteristic of a phantastron-type circuit and consequently the omission of the necessity of initial and/or subsequent adjustment of such prior art circuits; thereby permitting the provision of a versatile sealed phantastron-type circuit which heretofore was not considered feasible.

It is another object of the present invention to provide, in addition to the independence of the screen grid characteristics, a low impedance source from which the required pulse waveforms may be taken without requiring additional components.

In accordance with the preferred embodiment of the present invention a cathode follower is provided in the screen-suppressor grid loop in a phantastron-type circuit in combination with a resistive load connected between the plate supply and the cathode of the cathode follower. The cathode is coupled to the suppressor grid of the tube in the phantastron circuit, and the grid of the cathode follower is coupled to the screen grid of the aforementioned tube.

Other objects and many of the attendant advantages of the present invention will be readily appreciated as the same becomes better understood by reference to the following detailed description when considered in connection with the accompanying drawing which is a schematic diagram of the stabilized pulse generator circuit in accordance with the invention.

With reference now to the drawing there is illustrated a phantastron-type circuit which exemplifies one application of the invention. Tube 11 is the control tube for the Miller sweep circuit, while tube 12 comprising a link in the screen-suppressor grid loop of control tube 11 forms part of a circuit encompassing the invention. Tube 11 is a pentode such as, for example, a 6AS6 or 5784, having a control grid 13 connected through a suitable resistor 14 to a positive voltage supply 15 of, for example, +150 volts, and through a capacitor 16 to the plate 17 which is connected to an anode voltage supply 18 through a plate load resistor 19. The voltage of the anode supply 18, which preferably is variable to permit pulse width control, may be varied from a minimum value of zero volts to a maximum value equal to that of the positive voltage supply 15. The cathode 21 is preferably connected directly to ground. However, if a negative square wave output pulse is desired, for example, a resistor may be inserted in the cathode circuit. The screen-suppressor grid loop of control tube 11 is connected between the screen grid 22 and suppressor grid 23 of control tube 11 and includes a resistor 24 and capacitor 25 connected in parallel between the suppressor grid 23 and the cathode 26 of the cathode follower 12. A capacitor 27 couples the control grid 28 of the cathode follower 12 to the screen grid 22 of the control tube 11. A resistor 29 connected between the control grid 28 and ground establishes the D.C. voltage level at grid 28. A resistor 31 connected between the screen grid 22 and the positive voltage supply 15 establishes a D.C. voltage at the screen grid 22. The plate 32 of the cathode follower 12 is connected to the positive voltage supply 15 as is conventional for a cathode follower, and resistors 33—34 are connected respectively between the suppressor grid 23 and cathode 26 and a B— supply of, for example, −150 volts. A resistor 35 is connected between the anode voltage supply 18 and the cathode 26 of the cathode follower 12.

It will be apparent to those skilled in the art that a suitable trigger pulse may be applied to the control tube 11 at a number of different places such as, for example, the plate 17, control grid 13, screen grid 22, or suppressor grid 23. The output signal can also be taken at different places depending upon where the trigger pulse is applied. In the embodiment described herein a low impedance output signal may be taken at the cathode 26 of the cathode folower 12, or, alternately, if an output signal having a ramp function is desired the output signal may be taken at the plate 17 of the control tube 11.

It is not uncommon for MIL specifications to specify a phantastron circuit requiring no adjustments. Heretofore known prior art phantastron circuits could not meet these specifications and could not be sealed since it was necessary that they be calibrated, generally after being connected to the circuits with which they were to be associated. The provision of the cathode follower 12 per se simply and economically overcomes this disadvantage by providing independence of the screen characteristic and thereby eliminating the necessity for preadjustments. The D.C. level of the suppressor grid is also determined by the cathode follower on which it depends and through which the A.C. signal may be coupled. The provision of resistor 35 between the cathode follower and the anode voltage supply causes a pulse generator such as, for example, a phantastron as shown in the drawing to appear as a linear load to the anode voltage supply 18.

The provision of a resistive load represented by resistor 35 between the anode voltage supply 18 and the cathode 26 of the cathode follower 12 will, when of the correct value, cause the current drawn from the anode voltage supply 18 to be constant. That this is true can be seen from the fact that during the period between pulses the cathode 26 is low in voltage and hence the resistor 35 will draw current. During the pulse, however, the cathode 26 rises in voltage as the screen grid 22 rises in voltage, and resistor 35 will therefore draw less current. When an optimum value of resistance is selected for resistor 35, the aforementioned decrease in current drawn by the resistor 35 will be equal to the average current drawn by the plate 17. Since the current loading as seen by the anode voltage supply 18 is constant, this eliminates error in pulse length as a function of repetition rate characteristic of prior art devices.

It will also be apparent that as the voltage of the anode voltage supply 18 is increased and the phantastron output signal pulse lengthens, there will be a decrease in current through resistor 35 which lasts for a longer time. The net effect of this is to cause the phantastron to look like a linear load to the anode voltage supply 18 which prevents a departure from linearity of the control vs. time characteristic of the phantastron also characteristic of prior art devices.

An optimum value for resistor 35 can be calculated but this value can also be determined empirically. For example, for a particular application three different values of resistance for resistor 35 may be used with two different pulse repetition rates. The corresponding values of resistance and pulse length change may be plotted on a graph of pulse length change ($\Delta t$) vs. resistance and a line drawn connecting the three plotted points. The value of the resistance for the minimum change in pulse length may be selected as the optimum value.

As in most circuits providing precision operation, the present invention may have numerous refinements in the forms of temperature compensation, voltage regulation and application, over and under compensation in different circuits to improve the short and long time stability characteristics, jitter, etc. Such refinements and application of the invention to circuits having similar operating characteristics are obvious to those skilled in the art.

While the present invention has been described in a preferred embodiment, it is realized that modifications may be made and it is desired that it be understood that no limitations on the invention are intended other than those that may be imposed by the scope of the appended claims.

What is claimed is:

1. In a pulse generator circuit for generating a linear waveform utilizing a Miller sweep circuit and a pentode control tube having a screen grid and a suppressor grid loop, the combination comprising a cathode follower circuit having an input and an output and forming a link in the screen-suppressor grid loop, said cathode follower circuit input being coupled to said screen grid, and said cathode follower circuit output being coupled to said suppressor.

2. In a pulse generator circuit for generating a linear waveform utilizing a Miller sweep circuit and a pentode control tube having a screen grid and a suppressor grid loop the combination comprising: a cathode follower having an anode, cathode, and control electrode, said cathode follower forming a link in the sireen-suppressor grid loop, said control electrode being coupled to said screen grid and said cathode being coupled to said suppressor grid.

3. In a pulse generator circuit for generating a linear waveform utilizing a Miller sweep circuit and a pentode control tube having an anode, a screen grid-suppressor grid loop and a resistor connected to said anode the combination comprising: a cathode follower having an anode, cathode, and control electrode, said cathode follower forming a link in the screen-suppressor grid loop, said control electrode being coupled to said screen grid and said cathode being coupled to said suppressor grid; and a resistor connected betwen said control tube anode resistor and said cathode follower cathode.

4. In a pulse generator circuit for generating a linear waveform utilizing a Miller sweep circuit the combination comprising: an anode voltage supply; a control tube forming a part of said Miller sweep circuit and having at least an anode, cathode, screen grid, and suppressor grid, said anode being coupled to said anode voltage supply; a cathode follower having an anode, cathode, and control electrode; a resistor and capacitor connected in parallel between said suppressor grid and the cathode of said cathode follower; a capacitor connected between said screen grid and the control electrode of said cathode follower; means for supplying a positive voltage to said screen grid and the anode of said cathode follower; means for supplying a negative voltage to said suppressor grid and the cathode of said cathode follower; and a resistor connected between the cathode of said cathode follower and said anode voltage supply.

5. In a phantastron circuit utilizing a voltage plate supply for pulse width control and a screen-suppressor grid loop the combination comprising: a screen-suppressor grid loop including a resistor and capacitor connected in parallel and to the suppressor grid; and a cathode follower having an anode, cathode, and control electrode, said cathode being connected to the other end of said resistor and capacitor parallel combination, said control electrode being coupled to said screen grid.

6. In a phantastron circuit utilizing a voltage plate supply for pulse width control and a screen-suppressor grid loop the combination comprising: a screen-suppressor grid loop including a resistor and capacitor connected in parallel and to the suppressor grid; a cathode follower having an anode, cathode, and control electrode, said cathode being connected to the other end of said resistor-capacitor parallel combination; a capacitor coupling said screen grid and said control electrode; and a resistor connected betwen said plate supply and said cathode.

7. In a phantastron circuit utilizing a variable voltage anode supply for pulse width control the combination comprising: a control tube having at least an anode, screen grid, and suppressor grid; a cathode follower having an anode, cathode, and control electrode; a resistor and capacitor connected in parallel and between said suppressor grid and the cathode of said cathode follower; a capacitor connecting said screen grid and the control electrode of said cathode follower; means for supplying a positive voltage to said screen grid and the anode of said cathode follower; means for supplying a negative voltage to said suppressor grid and said cathode follower cathode; and a resistor connected between the cathode of said cathode follower and said voltage anode supply.

References Cited in the file of this patent

UNITED STATES PATENTS 2,692,334 Blumlein -------------- Oct. 19, 1954
2,835,815 Cones ---------------- May 24, 1958

UNITED STATES PATENT OFFICE

CERTIFICATE OF CORRECTION

Patent No. 2,993,175 July 18, 1961

Kenneth E. Brown

It is hereby certified that error appears in the above numbered patent requiring correction and that the said Letters Patent should read as corrected below.

Column 1, line 68, for "losss" read -- loss --; column 3, line 26, for "folower" read -- follower --; column 4, line 37, for "sireen-suppressor" read -- screen-suppressor --.

Signed and sealed this 5th day of December 1961.

(SEAL)
Attest:

ERNEST W. SWIDER
Attesting Officer

DAVID L. LADD
Commissioner of Patents

USCOMM-DC